US011991453B2

(12) United States Patent
Numata (10) Patent No.: US 11,991,453 B2
(45) Date of Patent: May 21, 2024

(54) IMAGE CAPTURING APPARATUS, METHOD FOR CONTROLLING THE SAME, WHICH DETERMINES EXPOSURE CONDITIONS FOR EACH IMAGE REGION USED FOR NEXT IMAGING

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 17/544,812

(22) Filed: Dec. 7, 2021

(65) Prior Publication Data
US 2022/0191379 A1 Jun. 16, 2022

(30) Foreign Application Priority Data
Dec. 14, 2020 (JP) .................................. 2020-206644

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ...... H04N 23/73; H04N 23/71; H04N 23/695; H04N 23/76; H04N 23/69
See application file for complete search history.

(56) References Cited

U.S. PATENT DOCUMENTS

| 9,973,706 | B2* | 5/2018 | Wang ........................ G06T 7/13 |
| 10,051,191 | B1 | 8/2018 | Kurien |
| 10,721,404 | B1 | 7/2020 | Battocchi |
| 2013/0162855 | A1* | 6/2013 | Kannermark ...... H04N 23/6811 |
| | | | 348/222.1 |
| 2014/0176789 | A1* | 6/2014 | Kubota .................. H04N 23/71 |
| | | | 348/362 |
| 2015/0029357 | A1 | 1/2015 | Hamalainen |
| 2015/0350508 | A1* | 12/2015 | Song ...................... H04N 23/84 |
| | | | 348/222.1 |
| 2018/0241927 | A1 | 8/2018 | Chen |

FOREIGN PATENT DOCUMENTS

JP 2010136205 A 6/2010

* cited by examiner

*Primary Examiner* — Luong T Nguyen
(74) *Attorney, Agent, or Firm* — CANON U.S.A., INC. IP Division (57) ABSTRACT

An image capturing apparatus includes a solid-state imaging device unit including imaging regions for each of which exposure conditions are individually controllable, a calculation unit configured to calculate, for positions on the solid-state imaging device, a movement amount between a first position on the solid-state imaging device unit, corresponding to a portion in an image captured at a present imaging, and a second position on the solid-state imaging device unit, corresponding to the same portion in an image captured for a next imaging, and calculate a direction in which the first and second positions move based on control information directed to the image capturing apparatus, and a determination unit configured to determine the exposure conditions for each of the imaging regions to be used for the next imaging based on luminance distribution information about a captured image at the present imaging, the movement amount, and the calculated direction.

20 Claims, 11 Drawing Sheets

BRIGHT ⟷ DARK

BRIGHT　　　　　　　　　　DARK

BRIGHT                                    DARK

IMAGE CAPTURING APPARATUS, METHOD FOR CONTROLLING THE SAME, WHICH DETERMINES EXPOSURE CONDITIONS FOR EACH IMAGE REGION USED FOR NEXT IMAGING

BACKGROUND OF THE INVENTION

Field of the Invention

The present invention relates to an image capturing apparatus, a method for controlling the image capturing apparatus, and a storage medium.

Description of the Related Art

A solid-state imaging device, such as a charge coupled device (CCD) sensor and a complementary metal-oxide semiconductor (CMOS) sensor, is used in an image capturing apparatus, such as a digital camera and a digital video camera.

Generally, the dynamic range of the solid-state imaging device is known to be narrow compared with the dynamic range in the natural world. Thus, if a scene having a wide dynamic range (a high dynamic range) is imaged by a normal method, an underexposure, an overexposure, or the like may occur.

To address this, Japanese Patent Application Laid-Open No. 2010-136205 proposes a technique in which a screen to be imaged is classified into a plurality of regions in accordance with the luminance and controls exposure conditions, such as a pixel exposure time and a gain of a pixel region by region. The technique discussed in Japanese Patent Application Laid-Open No. 2010-136205 enables the imaging of the scene having the high dynamic range by determining the exposure conditions based on information acquired from preliminary imaging and performing main imaging in accordance with the exposure conditions.

SUMMARY OF THE INVENTION

An image capturing apparatus includes a solid-state imaging device unit including a plurality of imaging regions for each of which exposure conditions are individually controllable, a calculation unit configured to calculate, for a plurality of positions on the solid-state imaging device, a movement amount between a first position on the solid-state imaging device unit, corresponding to a portion in an image captured at a present imaging, and a second position on the solid-state imaging device unit, corresponding to the same portion in an image captured for a next imaging, and calculate a direction in which the first and second positions move based on control information directed to the image capturing apparatus, and a determination unit configured to determine the exposure conditions for each of the plurality of imaging regions to be used for the next imaging based on luminance distribution information about a captured image at the present imaging, the movement amount, and the direction calculated by the calculation unit.

Further features of the present invention will become apparent from the following description of exemplary embodiments with reference to the attached drawings.

BRIEF DESCRIPTION OF THE DRAWINGS

FIG. 9A is a schematic view in which the luminance distribution in the image before the zoom-in is enlarged without a change into a luminance distribution in an image after the zoom-in. FIG. 9B is a schematic view illustrating a luminance distribution after actual zoom-in.

DESCRIPTION OF THE EMBODIMENTS

In the following description, embodiments for implementing the present invention will be described in detail with reference to the accompanying drawings. The embodiments that will be described below are merely an example as how the present invention can be embodied, and shall be modified or changed as appropriate according to the configuration of an apparatus to which the present invention is applied and various kinds of conditions. The present invention is in no way limited to the following embodiments. Each of the embodiments of the present invention described below can be implemented solely or as a combination of a plurality of the embodiments or features thereof where necessary or where the combination of elements or features from individual embodiments in a single embodiment is beneficial.

A first embodiment of the present invention will be described below. In the present embodiment, an image capturing apparatus corrects luminance distribution information about an image captured at the present imaging, based on a change between an angle of view used at the present imaging and an angle of view for the next imaging, thus acquiring luminance distribution information about an image to be captured for the next imaging. The image capturing apparatus determines exposure conditions for each region to be used for the next imaging based on the luminance distribution information about an image to be captured in the next imaging.

<Overall Configuration>

Figure 1:
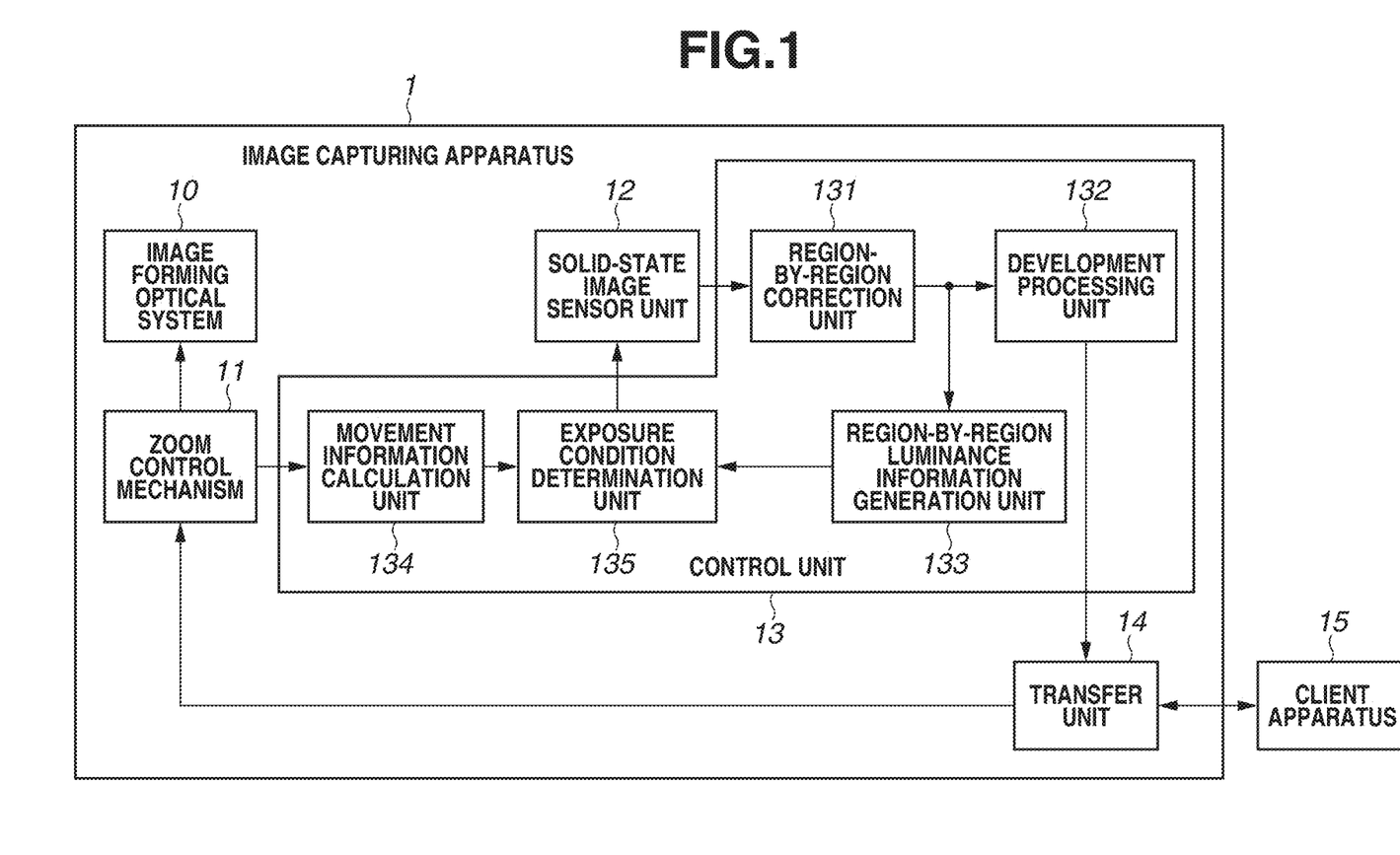
FIG. 1 is a block diagram of an image capturing apparatus according to a first exemplary embodiment of the present invention.

FIG. 1 illustrates an image capturing apparatus 1 according to the present embodiment and a network monitoring system including the image capturing apparatus 1.

The image capturing apparatus 1 includes an image forming optical system 10, a zoom control mechanism 11, a solid-state imaging device unit 12, a control unit 13, and a transfer unit 14.

The image forming optical system 10 includes a zoom lens, and the zoom control mechanism 11 can control a zoom function of the image forming optical system 10 and control the angle of view of the image forming optical system 10.

Light introduced into the image forming optical system 10 is received by the solid-state imaging device unit 12, and is imaged by being photoelectrically converted by the solid-state imaging device unit 12. The solid-state imaging device unit 12 includes a large number of pixels, and the exposure condition of each of the pixels is individually controllable.

The image capturing apparatus 1 is capable of capturing a moving image, and the solid-state imaging device unit 12 generates captured image data corresponding to one frame of the moving image by carrying out imaging once.

The control unit 13 controls the solid-state imaging device unit 12.

The transfer unit 14 is connected to an external client apparatus 15 via a wired or wireless network. The transfer unit 14 transfers image data processed by the control unit 13 to the client apparatus 15. The external client apparatus 15 transmits a control command for, for example, controlling the angle of view of imaging of the image forming optical system 10 (i.e., zoom control) to the image capturing apparatus 1 via the network. The transfer unit 14 receives the control command. The image capturing apparatus 1 transmits a response to the control command to the client apparatus 15.

The client apparatus 15 is, for example, a personal computer. The client apparatus 15 may supply electric power to the image capturing apparatus 1 via the network.

<Control Unit>

The control unit 13 is, for example a central processing unit (CPU), and operates in accordance with a computer program stored in a not-illustrated storage device.

The control unit 13 includes a region-by-region correction unit 131, a development processing unit 132, a region-by-region luminance information generation unit 133, a movement information calculation unit 134, and an exposure condition determination unit 135. These elements are implemented by the control unit 13 executing the computer program. All of the elements in the control unit 13 are provided separately from the solid-state imaging device unit 12 in FIG. 1, but a part or all of the functions of the control unit 13 may be included in the solid-state imaging device unit 12.

The region-by-region correction unit 131 corrects brightness of each region in the captured image data provided by the solid-state imaging device unit 12, and generates image data adjusted closer to brightness of each region in the real space.

The development processing unit 132 performs development processing, such as a white balance correction, Debayer, a noise reduction, a sharpness correction, and a gamma correction, on the image data provided by the region-by-region correction unit 131. The image data processed by the development processing unit 132 is provided to the transfer unit 14, and is transferred to the client apparatus 15.

Alternatively, the captured image data or the image data may be transferred to the client apparatus 15 without being corrected by the region-by-region correction unit 131 and/or being subjected to the development processing by the development processing unit 132.

<Generate Region-by-Region Luminance Information>

The region-by-region luminance information generation unit 133 generates region-by-region luminance information based on the image data provided by the region-by-region correction unit 131. The region-by-region luminance information is luminance distribution information indicating a luminance distribution in the image. The processing which is performed by the region-by-region luminance information generation unit 133 will be described with reference to FIGS. 2A and 2B.

Figure 2A:
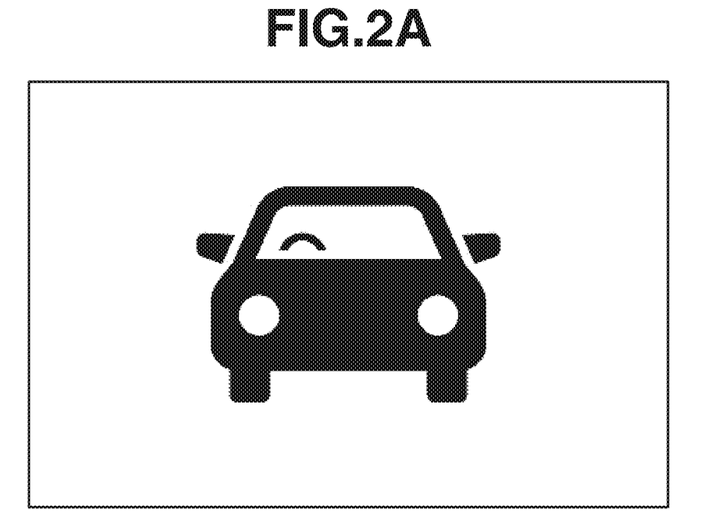
FIG. 2A illustrates an example of an image captured by the image capturing apparatus.
Figure 2B:
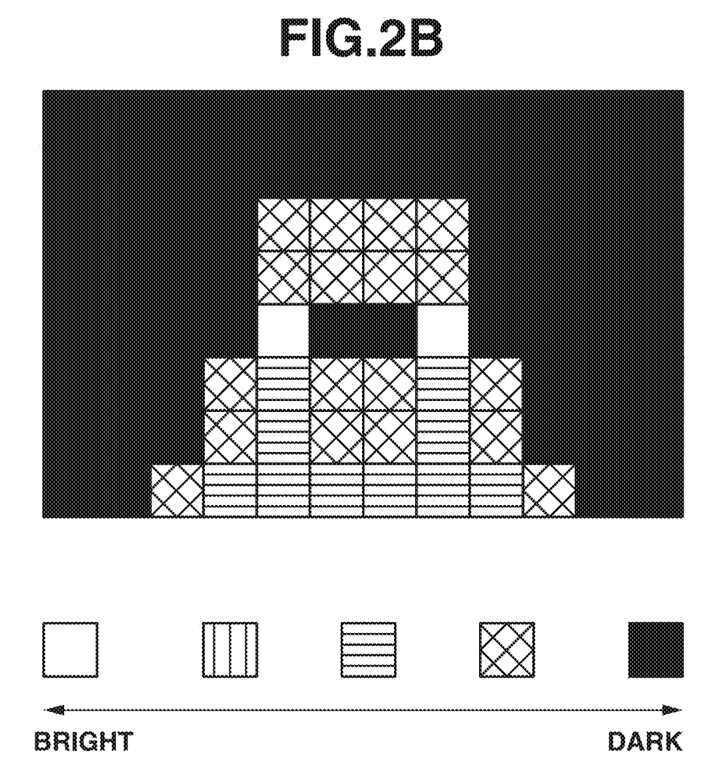
FIG. 2B illustrates a luminance distribution generated from the image in FIG. 2A.

FIG. 2A illustrates the image of the image data captured by the solid-state imaging device unit 12 and corrected by the region-by-region correction unit 131. As an example, FIG. 2A illustrates an image of an automobile that turns on the headlights at night, and the image has a high luminance contrast. FIG. 2B illustrates the luminance distribution indicated by the region-by-region luminance information generated by the region-by-region luminance information generation unit 133. As it is clear from FIG. 2B, the region-by-region luminance information indicates such a luminance distribution that the vehicle body portion of the automobile is dark and the headlights and the region illuminated by the headlights are bright.

The region-by-region luminance information generation unit 133 provide the region-by-region luminance information to the exposure condition determination unit 135.

FIG. 2B illustrates an example in which the image is divided into 12 regions horizontally and 8 regions vertically, but the number of regions in the image is not limited to this example and may be freely set in accordance with the number of pixels in the solid-state imaging device unit 12. FIG. 2B illustrates an example of an image having five levels of luminance, but the number of levels of luminance is also not limited to this example and can be freely set.

<Calculate Movement Information>

Zoom control information (angle-of-view control information) for controlling the zoom control mechanism 11 is provided to the movement information calculation unit 134. The zoom control information may be a control command provided by the transfer unit 14 or may be a control command that is provided by the transfer unit 14 and transferred from the zoom control mechanism 11.

The movement information calculation unit 134 monitors the zoom control information, and determines whether there is a change between the angle of view used at the present imaging and the angle of view for the next imaging. If there is a change in the angle of view, the movement information calculation unit 134 calculates a distance information between respective positions, on the solid-state imaging device unit 12, each corresponding to a different one of portions in the image captured at the present imaging and respective positions, on the solid-state imaging device unit 12, each corresponding to a different one of the portions for the next imaging, based on the change in the angle of view. To put it another way, the movement information calculation unit 134 calculates, for a plurality of positions on the solid-state imaging device 12, a movement amount between a first position on the solid-state imaging device 12, corresponding to a portion in the captured image at the present imaging, and a second position on the solid-state imaging device 12, corresponding to the same portion in the captured image at the next imaging. In other words, the movement information calculation unit 134 calculates a movement amount of the same portion between the present imaging frame and the next imaging frame. If there is a change in the angle of view, the movement information calculation unit 134 calculates a direction in which these positions move based on the change in the angle of view. A "position on the solid-state imaging device unit 12" refers to a position contained in the imaging region of the solid-state imaging device unit 12, and may be, for example, a pixel. The movement information calculation unit 134 calculates the movement amount and the movement direction of the position for a large number of portions in the image. The movement information calculation unit 134 provides movement information which is information indicating the calculated movement amount and movement direction to the exposure condition determination unit 135.

Figure 3:
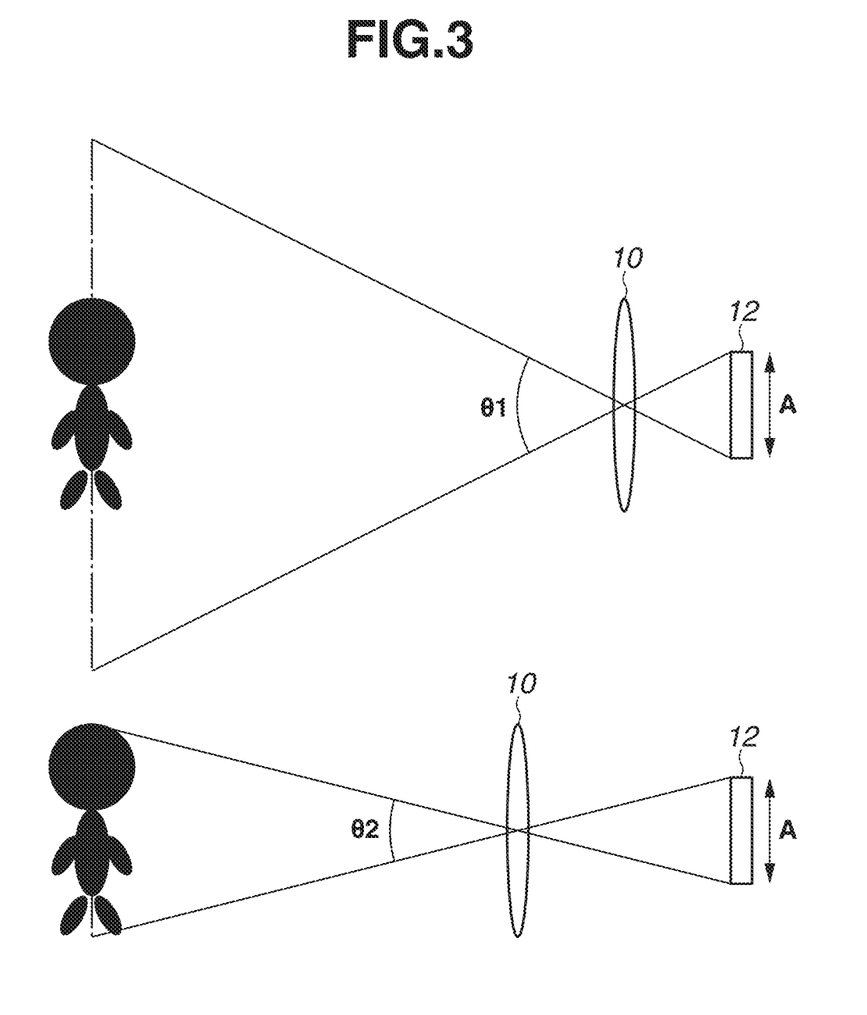
FIG. 3 illustrates a change in an angle of view due to zoom control.

FIG. 3 illustrates a change in the angle of view due to zoom control. An angle θ1 is an angle of view of imaging during wide-angle imaging (zoom-out), and θ2 is an angle of view of imaging during telephoto imaging (zoom-in). Assume that A represents the height of the entire imaging region of the solid-state imaging device unit 12. The movement amount in the vertical direction between before and after the zoom control at a position on the solid-state imaging device unit 12 that corresponds to a certain portion in the image is calculated as a function of the position of this portion in the image captured at the present imaging, θ1, θ2, and A. The movement amount in the horizontal direction between before and after the zoom control at a position on the solid-state imaging device unit 12 that corresponds to a certain portion in the image is calculated as a function of the position of this portion in the image captured at the present imaging, θ1, θ2, and the width of the entire imaging region of the solid-state imaging device unit 12. More specifically, the position corresponding to the central portion in the image is not changed between before and after the zoom control, but the position corresponding to another portion is changed according to the change in the angle of view between before and after the zoom control.

Figure 4:
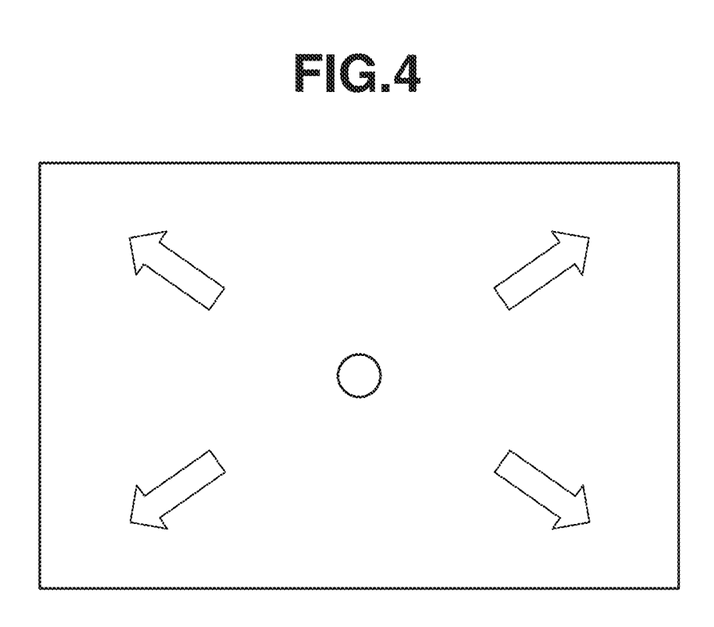
FIG. 4 illustrates a direction in which a position of interest moves in zoom-in control.

FIG. 4 illustrates the direction in which a position on the solid-state imaging device unit 12 moves during the zoom control.

Even in a case where the zoom-in control is performed, the position of the central portion in the field of view is not changed, but the peripheral portion is enlarged as indicated by the arrows at the next imaging. In the zoom-out control, the peripheral portion is reduced in size at the next imaging.

<Determine Exposure Conditions>

The movement information (the movement amounts and the directions of a large number of positions) calculated by the movement information calculation unit 134 and the region-by-region luminance information about the present imaging (the luminance distribution information about the image captured at the present imaging) that is generated by the region-by-region luminance information generation unit 133 are provided to the exposure condition determination unit 135. The exposure condition determination unit 135 determines the exposure conditions for each region (e.g., for each pixel) to be used for the time of the next imaging based on the movement information calculated by the movement information calculation unit 134 and the region-by-region luminance information generated by the region-by-region luminance information generation unit 133, and drives the solid-state imaging device unit 12 under the determined exposure conditions.

More specifically, the exposure condition determination unit 135 initially generates region-by-region luminance information (luminance distribution information) about the time of the next imaging by applying the movement information to the region-by-region luminance information about the present imaging.

Figure 5:
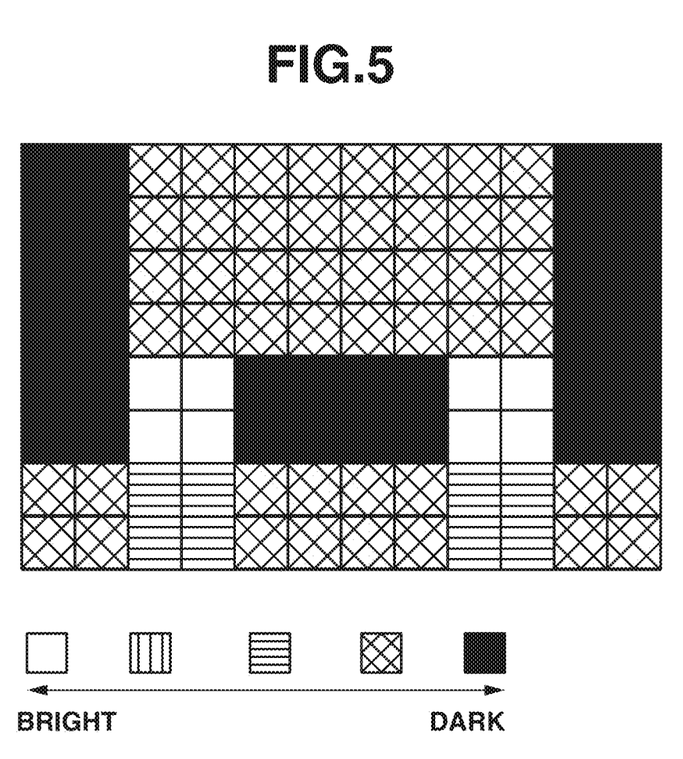
FIG. 5 illustrates a luminance distribution that is generated for the zoom-in control according to the first exemplary embodiment and is to be applied to next imaging.

In the case of the zoom-in control, the exposure condition determination unit 135 generates the region-by-region luminance information about the next imaging by applying the movement information schematically illustrated in FIG. 4 to the region-by-region luminance information about the present imaging that is exemplified in FIG. 2B. FIG. 5 illustrates the luminance distribution indicated by the region-by-region luminance information about the next imaging that is generated by the exposure condition determination unit 135. The distribution in FIG. 5 corresponds to a distribution obtained by enlarging the distribution in FIG. 2B as a whole. More specifically, the distribution in FIG. 2B is enlarged twofold vertically and horizontally in FIG. 5 according to the change in the angle of view of imaging. Thus, FIG. 5 has the same brightness for every 2×2 pixels.

In the case of the zoom-out control, the exposure condition determination unit 135 generates the region-by-region luminance information about the next imaging so as to be able to acquire a distribution into which the distribution indicated by the region-by-region luminance information about the present imaging is reduced in size.

After generating the region-by-region luminance information about the next imaging, the exposure condition determination unit 135 determines the exposure conditions for each region to be used for the next imaging. More specifically, the exposure condition determination unit 135 determines an exposure value (an EV value) by applying the luminance of each region that is indicated by the region-by-region luminance information about the next imaging to a table for determining the exposure conditions exemplified in FIG. 6. More specifically, the exposure condition determination unit 135 applies a low EV value to a region to which a bright luminance is specified by the region-by-region luminance information and applies a high EV value to a region to which a dark luminance is specified, thus preventing or reducing an overexposure and an underexposure. The exposure condition determination unit 135 notifies the solid-state imaging device unit 12 of the determined EV value. The solid-state imaging device unit 12 determines a charge accumulation time and a gain of each region based on the EV value that the solid-state imaging device unit 12 is notified of, and carries out the next imaging using the determined charge accumulation time and gain.

Figure 6:
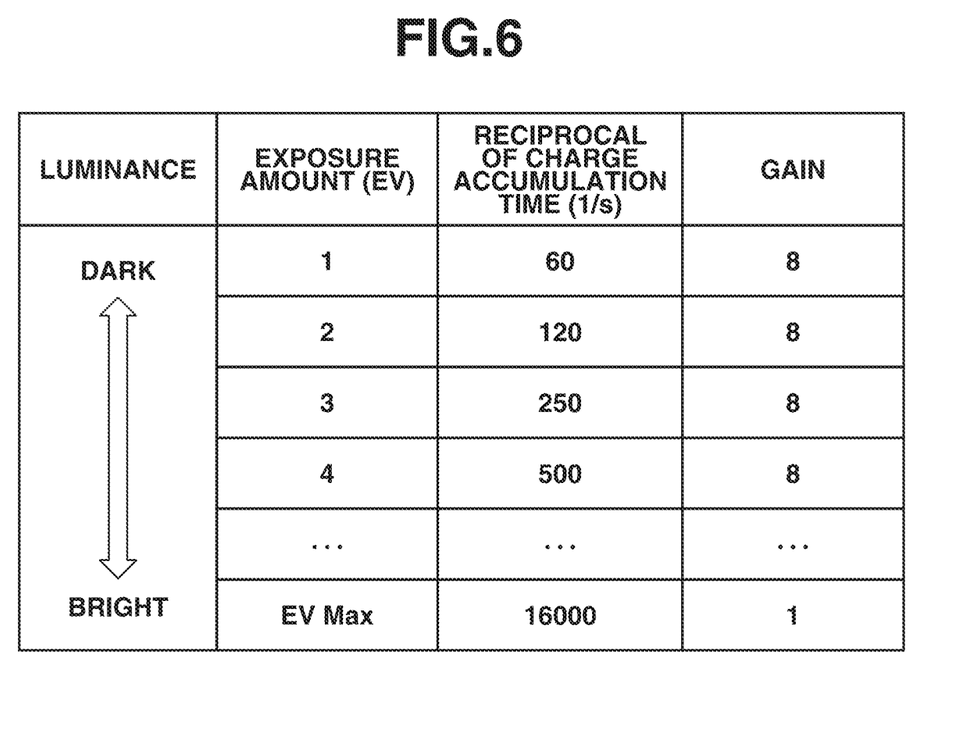
FIG. 6 illustrates an example of a table for determining exposure conditions.

Alternatively, the exposure condition determination unit 135 may determine the charge accumulation time and the gain by applying the luminance of each region that is indicated by the region-by-region luminance information about the next imaging to the table for determining the exposure conditions exemplified in FIG. 6. In this case, the solid-state imaging device unit 12 carries out the next imaging using the charge accumulation time and the gain that the solid-state imaging device unit 12 is notified of by the exposure condition determination unit 135.

As described above, the region-by-region correction unit 131 corrects the brightness of each region for the captured image data provided by the solid-state imaging device unit 12. In this correction, the region-by-region correction unit 131 uses the exposure conditions for each region that are determined by the exposure condition determination unit 135, and acquires the brightness of each region in the real space without improvement in the exposure conditions for each region. This means that the region-by-region luminance information generated by the region-by-region luminance information generation unit 133 indicates a luminance distribution in the real space.

Conventional image capturing apparatuses determine the exposure conditions for the next imaging without consideration of a shift between an image captured at the present imaging and an image to be captured for the next imaging. Thus, the conventional image capturing apparatuses may expose a region corresponding to high luminance, such as the headlights of the automobile, with a high EV value, and expose a background region not illuminated by the headlights with a low EV value. Thus, an overexposure and/or an underexposure may undesirably occur due to the shift between the image captured at the present imaging and the image to be captured for the next imaging. However, the image capturing apparatus 1 according to the present embodiment determines the exposure conditions for the next imaging in consideration of the shift between the image captured at the present imaging and the image to be captured for the next imaging. This configuration enables the image capturing apparatus 1 to perform imaging with prevention or reduction of an overexposure and an underexposure even in a case where the images are shifted between the present imaging and the next imaging according to the change in the angle of view due to the zoom control.

<Flowchart>

Figure 7:
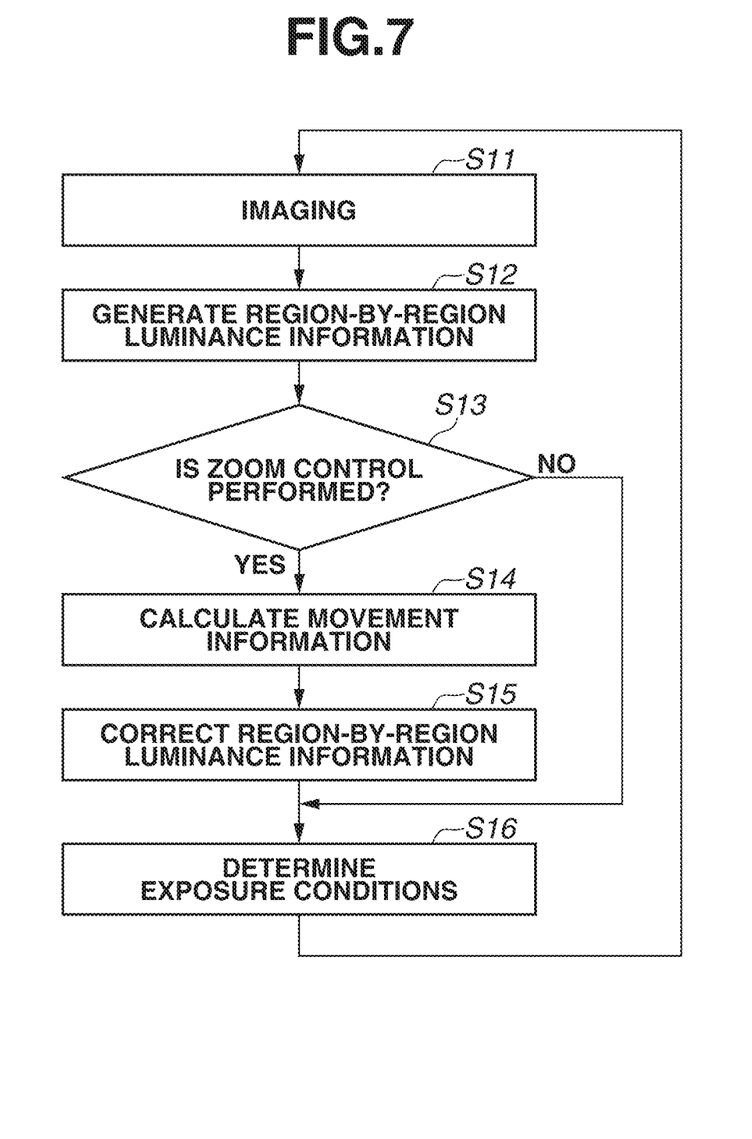
FIG. 7 is a flowchart illustrating the operation of the image capturing apparatus according to the first exemplary embodiment.

The operation of the image capturing apparatus 1 according to the first embodiment will be described with reference to a flowchart of FIG. 7. The following description will focus on the flow of the processing for determining the exposure conditions for the next imaging, and will omit the detailed description of other processing.

First, in step S11, the image capturing apparatus 1 performs imaging (acquires captured image data corresponding to one frame of a moving image). Next in step S12, the region-by-region luminance information generation unit 133 generates the region-by-region luminance information. Next in step S13, the image capturing apparatus 1 determines whether the zoom control is performed for the next imaging. If the zoom control is performed (YES in step S13), the operation proceeds to step S14. If the zoom control is not performed (NO in step S13), the operation proceeds to step S16.

In step S14, the movement information calculation unit 134 calculates the movement information based on control information directed to the image capturing apparatus 1 (more specifically, the zoom control information), and provides the movement information to the exposure condition determination unit 135. In step S15, the exposure condition determination unit 135 calculates the region-by-region luminance information about the next imaging by correcting the region-by-region luminance information about the present imaging that is provided by the region-by-region luminance information generation unit 135 using the movement information provided by the movement information calculation unit 134. In step S16, the exposure condition determination unit 135 determines the exposure conditions for each region to be used for the next imaging based on the region-by-region luminance information to be used for the next imaging and the table for determining the exposure conditions. After step S16, the operation returns to step S11. In this manner, the solid-state imaging device unit 12 performs the imaging using the exposure conditions for each region that are determined by the exposure condition determination unit 135.

If the determination in step S13 is NO (NO in step S13), the exposure condition determination unit 135 determines the exposure conditions for each region to be used for the next imaging by using, as the region-by-region luminance information about the next imaging, the region-by-region luminance information about the present imaging that is provided by the region-by-region luminance information generation unit 133, without making a correction.

A second embodiment of the present invention will be described below. The image capturing apparatus according to the embodiment is configured in a similarly manner to the first embodiment described in conjunction with FIG. 1. However, the image capturing apparatus 1 according to the second embodiment is different in terms of the method of generating the region-by-region luminance information (the luminance distribution information) about the image to be captured for the next imaging by the exposure condition determination unit 135. In the present embodiment, the image capturing apparatus 1 calculates a luminance of a region of interest for the next imaging by performing interpolation using the luminance of the region of interest at the present imaging and luminances of a plurality of adjacent regions adjacent to the region of interest at the present imaging, in acquiring the luminance distribution information about the image to be captured for the next imaging based on the luminance distribution information about the image captured at the present imaging.

Figure 8:
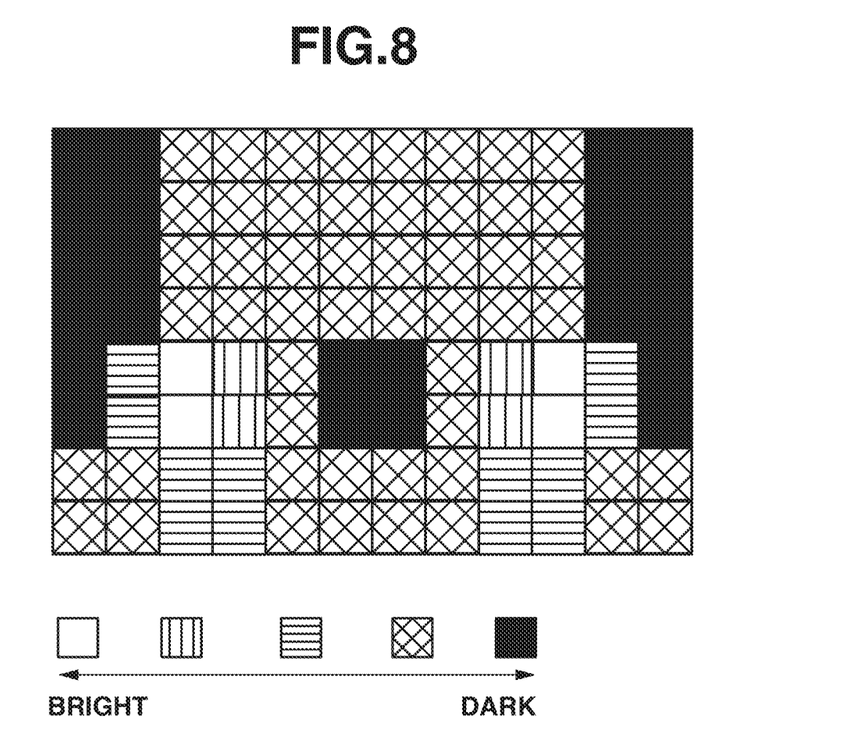
FIG. 8 illustrates a luminance distribution that is generated for the zoom-in control according to a second exemplary embodiment and is to be applied to the next imaging.

FIG. 8 illustrates the luminance distribution indicated by the region-by-region luminance information to be used for the next imaging that is generated by the exposure condition determination unit 135 for the zoom-in control according to the present embodiment. FIG. 8 corresponds to FIG. 5 according to the first embodiment. In other words, FIG. 8 corresponds to the region-by-region luminance information about the next imaging that the exposure condition determination unit 135 generates by applying the movement information schematically illustrated in FIG. 4 to the region-by-region luminance information about the present imaging that is exemplified in FIG. 2B in the case of the zoom-in control.

As seen from a comparison between FIG. 8 and FIG. 5, the luminance of each of the regions is determined by performing interpolation using the luminance of this region and the luminances of regions surrounding it in FIG. 8, and thus the same brightness is not necessarily shared for every 2×2 pixels as in FIG. 5. In this manner, the image capturing apparatus 1 can perform imaging under further desirable exposure conditions by calculating the luminance of the region of interest for the time of the next imaging through interpolation using the luminance of the region of interest at the present imaging and the luminances of the plurality of adjacent regions adjacent to the region of interest at the present imaging in determining the region-by-region luminance information about the next imaging. In other words, an overexposure and an under exposure can be further prevented or reduced.

Here, the "region of interest" refers to a region contained in the imaging region of the solid-state imaging device unit 12, and is formed by a plurality of pixels.

Advantageous Effects of Second Embodiment

Figure 9A:
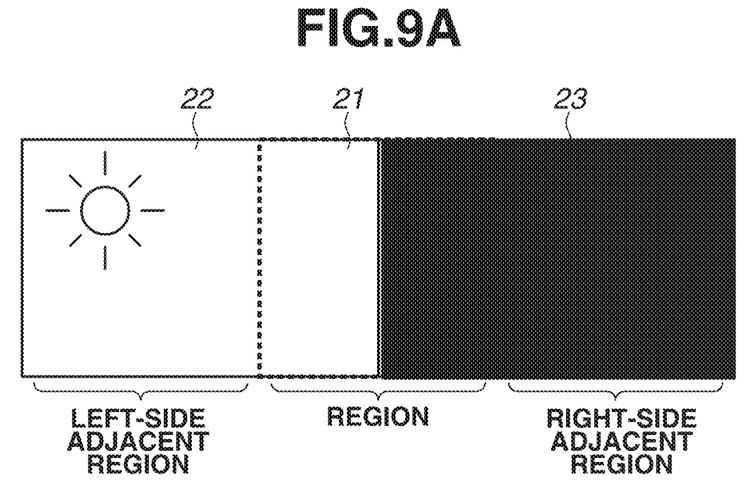

FIG. 9A is a schematic view in which the luminance distribution in the image before the zoom-in that is generated by the region-by-region luminance information generation unit 133 is enlarged into the luminance distribution in the image after the zoom-in without a change. In other words, FIG. 9A illustrates the luminance distribution indicated by the region-by-region luminance information generated by the exposure condition determination unit 135 according to the first embodiment. In such a case that a window letting in sunlight is present in an adjacent region 22 on the left side of a region 21, and a dark wall is present in an adjacent region 23 on the right side of the region 21, a boundary between the bright portion and the dark portion is located in the region 21.

Figure 9B:
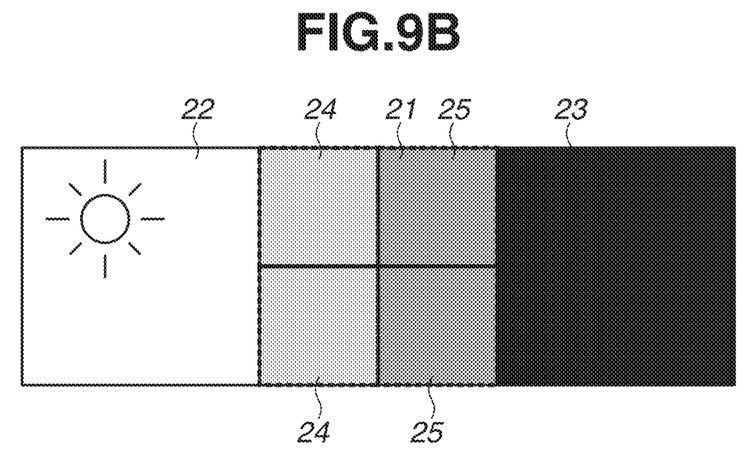

However, suppose that the luminance distribution illustrated in FIG. 9B is obtained actually after the zoom-in. In this case, a luminance of a region 24, which is a left half of the region 21, is lower than a luminance of the left-side adjacent region 22 and is higher than a luminance of a region 25, which is a right half of the region 21. The luminance of the region 25, which is the right half of the region 21, is lower than the luminance of the region 24, which is the left half of the region 21, and is higher than a luminance of the right-side adjacent region 23. Thus, if imaging is performed in dependence upon the luminance distribution in FIG. 9A, the region 24, which is the left half of the region 21, is slightly underexposed while the region 25, which is the right half of the region 21, is slightly overexposed.

Figure 9C:
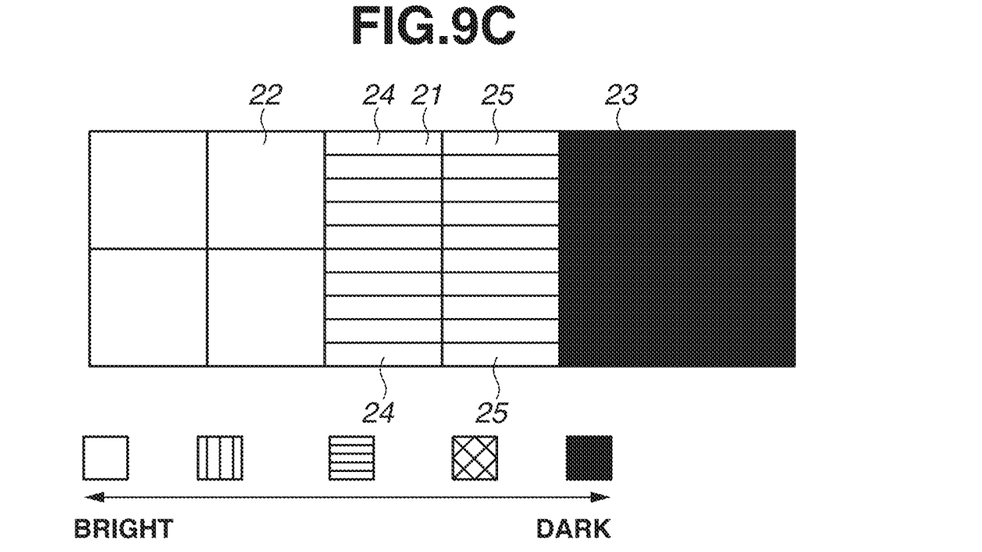
FIG. 9C illustrates a luminance distribution for the next imaging that is generated by a different method from the second exemplary embodiment.

Moreover, as illustrated in FIG. 9C, hypothetically supposing that the luminance of the entire region 21 is determined to be an average value or an intermediate value of the luminance of the left-side adjacent region 22 and the luminance of the right-side adjacent region 23, the region 24, which is the left half of the region 21, is slightly overexposed while the region 25, which is the right half of the region 21, is slightly underexposed.

Figure 9D:
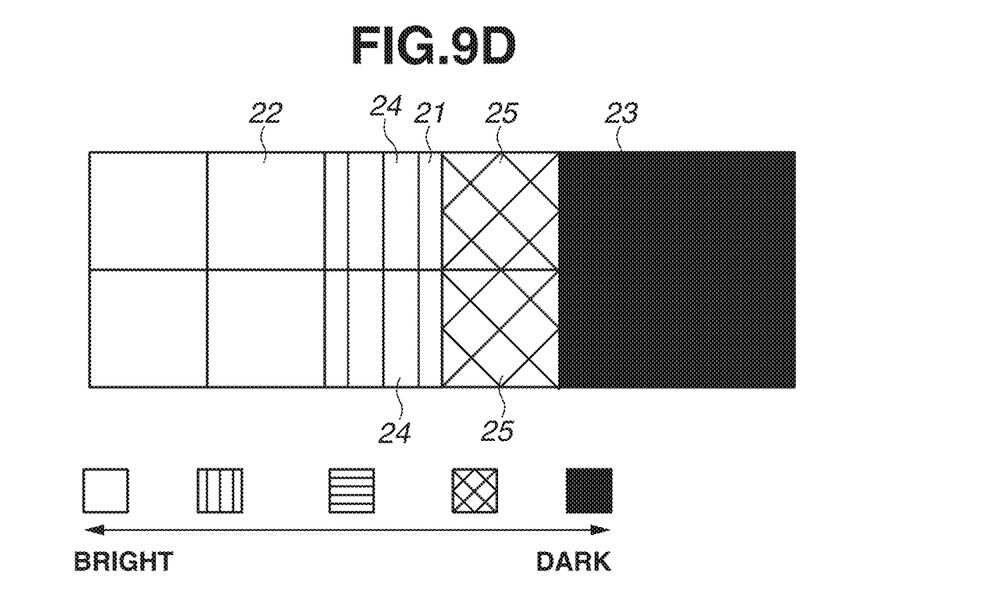
FIG. 9D illustrates a luminance distribution for the next imaging that is generated according to the second exemplary embodiment.

FIG. 9D illustrates the luminance distribution for the next imaging that is generated by the exposure condition determination unit 135 according to the present embodiment. In the present embodiment, the exposure condition determination unit 135 calculates the luminance of the region of interest by performing interpolation using the luminance of the region of interest and the luminances of the plurality of adjacent regions adjacent to the region of interest. At this time, the relative positions of the regions 24 and 25 in the region 21 are also taken into consideration. Thus, the luminance of the region 24, which is the left half of the region 21, can be set to a relatively high value, and the luminance of the region 25, which is the right half of the region 21, can be set to and a relatively low value.

As a result, the region 24, which is the left half, and the region 25, which is the right half, each can be imaged under further appropriate exposure conditions.

<Method for Interpolation>

Specifically, in a case where the zoom control mechanism 11 performs the zoom-in control between when the present imaging is performed and when the next imaging is performed, the exposure condition determination unit 135 can calculate a luminance K of the region of interest after the zoom-in (for the next imaging) using the following Equation 1.

$$K=(1-a-b)C+a\{(1-\alpha)L+\alpha R\}+b\{(1-\beta)U+\beta D\} \quad \text{(Equation 1)}$$

Figure 10:
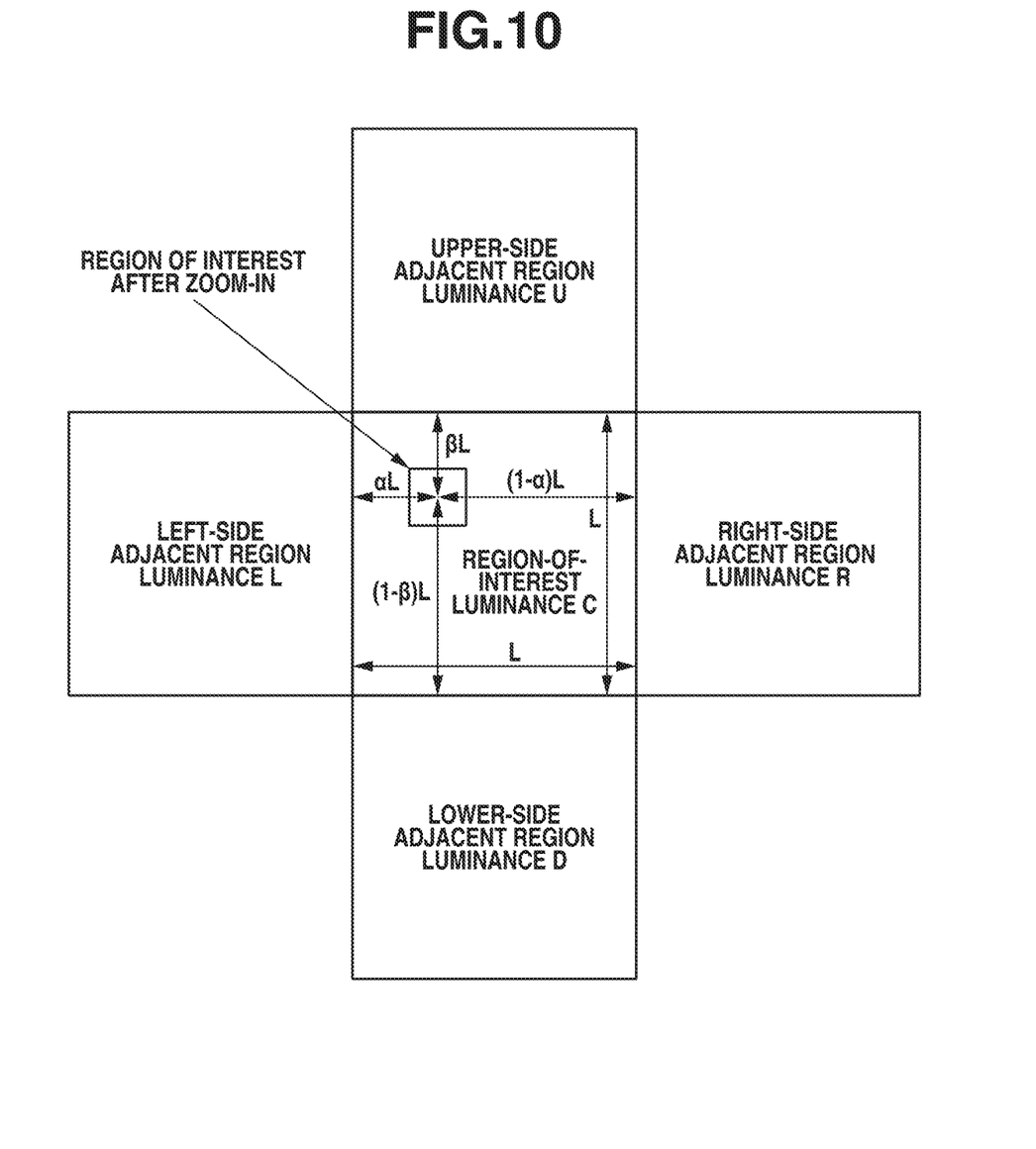
FIG. 10 illustrates a method for interpolating the luminance according to the second exemplary embodiment.

In Equation 1, C, L, R, U, and D represent the luminances of the region of interest, the left-side adjacent region, the right-side adjacent region, the upper-side adjacent region, and the lower-side adjacent region before the zoom-in (at the present imaging), respectively, (refer to FIG. 10). A variable $\alpha$ represents a relative distance from the center of gravity of the region of interest after the zoom-in (for the next imaging) to the left-side adjacent region before the zoom-in (at the present imaging), and $\beta$ represents a relative distance from the center of gravity of the region of interest after the zoom-in (for the next imaging) to the upper-side adjacent region before the zoom-in (at the present imaging). Variables a and b are weighting coefficients. The weighting coefficient a determines the influence of the luminances L and R of the left and right adjacent regions at the present imaging on the luminance K of the region of interest for the next imaging. The luminances L and R of the left and right adjacent regions at the present imaging are more highly reflected in the luminance K of the region of interest for the next imaging as the weighting coefficient a increases, and the luminance C of the region of interest at the present imaging is more highly reflected in the luminance K of the region of interest for the next imaging as the weighting coefficient a reduces. The weighting coefficient b determines the influence of the luminances U and D of the upper and lower adjacent regions at the present imaging on the luminance K of the region of interest for the next imaging. The luminances U and D of the upper and lower adjacent regions at the present imaging are more highly reflected in the luminance K of the region of interest for the next imaging as the weighting coefficient b increases, and the luminance C of the region of interest at the present imaging is more highly reflected in the luminance K of the region of interest for the next imaging as the weighting coefficient b reduces.

Thus, the exposure condition determination unit 135 calculates the luminance of the region of interest for the next imaging based on the luminances of the region of interest and the adjacent regions at the present imaging, the relative distances from the center of gravity of the region of interest for the next imaging to the adjacent regions at the present imaging, and the movement amount and the direction calculated by the movement information calculation unit 134.

The weighting coefficients a and b may be either the same as each other or different from each other. The exposure condition determination unit 135 may change the weighting coefficients a and b for each region even in the same image or may change the weighting coefficients a and b according to a scene. In the following description, an example of settings of the weighting coefficients a and b will be described.

It is desirable that the exposure condition determination unit 135 set the weighting coefficient a to a larger value as the difference between the luminance L of the left-side adjacent region and the luminance R of the right-side adjacent region at the present imaging increases. This is because it becomes more likely that the boundary between the bright and dark portions in the horizontal direction exists in the region of interest before the zoom-in as the difference between L and R increases. The exposure condition determination unit 135 calculates the luminance K of the region of interest for the next imaging in such a manner that the luminances L and R of these adjacent regions are highly reflected in the luminance K of the region of interest for the next imaging by setting the weighting coefficient a to a large value.

Similarly, it is desirable that the exposure condition determination unit 135 set the weighting coefficient b to a larger value as the difference between the luminance U of the upper-side adjacent region and the luminance D of the lower-side adjacent region at the present imaging increases. This is because it becomes more likely that the boundary between the bright and dark portions in the vertical direction exists in the region of interest before the zoom-in as the difference between U and D increases. The exposure condition determination unit 135 calculates the luminance K of the region of interest for the next imaging in such a manner that the luminances U and D of these adjacent regions are highly reflected in the luminance K of the region of interest for the next imaging by setting the weighting coefficient b to a large value.

In this manner, the exposure condition determination unit 135 calculates the luminance K of the region of interest for the next imaging in such a manner that the luminances of the adjacent regions are more highly reflected in the luminance K of the region of interest for the next imaging as the luminance difference increases between two adjacent regions that are adjacent to the region of interest at the present imaging and lined up in one direction (|L−R| or |U−D|).

In other words, as the difference reduces between the luminance L of the left-side adjacent region and the luminance R of the right-side adjacent region at the present imaging that are located in the opposite direction from each other, it becomes less likely that the boundary between the bright and dark portions in the horizontal direction exists in the region of interest before the zoom-in. Similarly, as the difference reduces between the luminance U of the upper-side adjacent region and the luminance D of the lower-side adjacent region at the present imaging, it becomes less likely that the boundary between the bright and dark portions in the vertical direction exists in the region of interest before the zoom-in. For this reason, it is desirable to reduce the value of a or b as the luminance difference between L and R or the luminance difference between U and D reduces. In particular, it is desirable to set a=b=0 in a case where both the difference between L and R and the difference between U and D are smaller than a specific threshold value. In this case, the luminance C of the region of interest at the present imaging is supposed to be set as the luminance K of the region of interest for the next imaging without conducting the interpolation using the luminances of the adjacent regions (in Equation 1, K is calculated to be K=C in the case of a=b=0).

In this case, the interpolation processing is supposed to be performed only in the region containing the boundary between the bright and dark portions, and thus, the load of the interpolation processing can be reduced.

In the case where the zoom control mechanism 11 performs the zoom-out control between the present imaging and the next imaging, the exposure condition determination unit 135 generates the region-by-region luminance information for the next imaging so as to be able to acquire a distribution into which the distribution indicated by the region-by-region luminance information about the present imaging is reduced.

In the case of the zoom-out control, a plurality of regions at the present imaging is supposed to be located in one region for the next imaging unlike in the case of the zoom-in control. Thus, it is desirable that the exposure condition determination unit 135 calculate the luminance of the region of interest for the next imaging by averaging the luminances of a plurality of regions at the present imaging (the luminance of the region of interest at the present imaging and the luminances of a plurality of adjacent regions adjacent to the region of interest at the present imaging).

In the case of the zoom-out control, the luminance information to be referred to is partially insufficient in the peripheral portion in the angle of view of imaging for the next imaging. Thus, it is desirable that the exposure condition determination unit 135 estimate the luminance of the region of interest located in the peripheral portion in the angle of view of imaging for the next imaging based on the luminances of the region of interest and adjacent regions at the present imaging.

Other Embodiments

Having described the embodiments of the present invention, the above descriptions are not intended to limit the present invention, and various exemplary modifications including omission, addition, and replacement of a component are possible within the technical scope of the present invention.

For example, in the above-described embodiments, the exposure conditions for each region are determined at the time of imaging of each frame in the moving image. Thus, the above-described embodiments do not involve a concept of preliminary imaging to acquire an image for reference that is not presented to a user and main imaging to acquire an image that is presented to the user as in the technique discussed in Japanese Patent Application Laid-Open No. 2010-136205. However, the above-described embodiments may be modified so as to determine the exposure conditions for each region in the main imaging to acquire an image that is presented to the user based on the preliminary imaging captured to acquire an image for reference that is not presented to the user.

In the above-described embodiments, the exposure conditions for each region to be used for the next imaging are determined in a case where the images are shifted between the present imaging and the next imaging according to the zoom control, i.e., a change in the angle of view. However, the exposure conditions for each region to be used for the next imaging may be determined in a case where the images are shifted between the present imaging and the next imaging according to a movement of the field of view of the camera accompanying a pan or a tilt instead of the zoom control. In this case, the movement information calculation unit 134 calculates the movement amount and the movement direction of the position for a large number of portions in the image based on control information about the pan or the tilt.

The present invention can also be embodied by processing that supplies a program capable of realizing one or more functions of the above-described embodiments to a system or an apparatus via a network or a recording medium, and causes one or more processors in a computer of this system or apparatus to read out and execute the program. In this case, the program (the program code) read out from the recording medium itself is supposed to realize the functions of the embodiments. The recording medium recording this program therein can constitute the present invention.

An operating system (OS) or the like running on the computer may partially or entirely perform the actual processing based on an instruction of the program read out by the computer, and the functions of the above-described embodiments may be realized by this processing.

At least a part of the functional blocks illustrated in FIG. 1 may be realized by hardware. In the case where the functional blocks illustrated in FIG. 1 are realized by hardware, this can be achieved by, for example, using a predetermined compiler to thereby automatically generate a dedicated circuit on a field-programmable gate array (FPGA) from a program for realizing each step. The functional blocks in FIG. 1 may also be realized as hardware by forming a gate array circuit in a manner similar to the FPGA. The functional blocks in FIG. 1 may also be realized by an application specific integrated circuit (ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2020-206644, filed Dec. 14, 2020, which is hereby incorporated by reference herein in its entirety.

What is claimed is:

1. An image capturing apparatus comprising:
   at least one processor; and
   a memory coupled to the at least one processor storing instructions that, when executed by the at least one processor, cause the at least one processor to function as:
   a solid-state imaging device unit including a plurality of imaging regions for each of which exposure conditions are individually controllable;
   a calculation unit configured to calculate, for a plurality of positions on the solid-state imaging device, a movement amount between a first position on the solid-state imaging device unit, corresponding to a portion in an image captured at a present imaging, and a second position on the solid-state imaging device unit, corresponding to a same portion in an image captured for a next imaging, and configured to calculate a direction in which the first and second positions move based on control information directed to the image capturing apparatus; and
   a determination unit configured to determine the exposure conditions for each of the plurality of imaging regions to be used for the next imaging based on luminance distribution information about a captured image at the present imaging, and the movement amount and the direction calculated by the calculation unit.

2. The image capturing apparatus according to claim 1, wherein the at least one processor further functions as a change unit configured to change an angle of view, and wherein the calculation unit calculates the movement amount and the direction based on a change between an angle of view at the present imaging and an angle of view for the next imaging.

3. The image capturing apparatus according to claim 2, wherein the determination unit calculates a luminance of a region of interest for the next imaging by performing interpolation using a luminance of the region of interest at the present imaging and luminances of a plurality of adjacent regions adjacent to the region of interest at the present imaging to determine the exposure conditions for the region of interest for the next imaging.

4. The image capturing apparatus according to claim 3, wherein, in a case where the change unit performs zoom-in control between the present imaging and the next imaging, the determination unit calculates the luminance of the region of interest for the next imaging based on the luminances of the region of interest and the plurality of adjacent regions at the present imaging, a relative distance from a center of gravity of the region of interest for the next imaging to the adjacent region at the present imaging, and the movement amount and the direction calculated by the calculation unit.

5. The image capturing apparatus according to claim 4, wherein the determination unit calculates the luminance of the region of interest for the next imaging in such a manner that, as a luminance difference increases between two adjacent regions that are adjacent to the region of interest at the present imaging and lined up in one direction, the luminances of the two adjacent regions are more highly reflected in the luminance of the region of interest for the next imaging.

6. The image capturing apparatus according to claim 4, wherein the determination unit sets the luminance of the region of interest at the present imaging to the luminance of the region of interest for the next imaging without performing the interpolation using the luminances of the plurality of adjacent regions in a case where both a luminance difference between two adjacent regions that are adjacent to the region of interest at the present imaging and lined up in a vertical direction and a luminance difference between two adjacent regions that are adjacent to the region of interest at the present imaging and lined up in a horizontal direction are smaller than a specific threshold value.

7. The image capturing apparatus according to claim 5, wherein the determination unit sets the luminance of the region of interest at the present imaging to the luminance of the region of interest for the next imaging without performing the interpolation using the luminances of the plurality of adjacent regions in a case where both a luminance difference between two adjacent regions that are adjacent to the region of interest at the present imaging and lined up in a vertical direction and a luminance difference between two adjacent regions that are adjacent to the region of interest at the present imaging and lined up in a horizontal direction are smaller than a specific threshold value.

8. The image capturing apparatus according to claim 4, wherein, in a case where the change unit performs the zoom-in control between the present imaging and the next imaging, the determination unit calculates the luminance of the region of interest for the next imaging using the following equation, $$K=(1-a-b)C+a\{(1-\alpha)L+\alpha R\}+b\{(1-\beta)U+\beta D\},$$

where K represents the luminance of the region of interest for the next imaging, C, L, R, U, and D represent the luminances of the region of interest, a left-side adjacent region, a right-side adjacent region, an upper-side adjacent region, and a lower-side adjacent region at the present imaging, respectively, $\alpha$ represents the relative distance from the center of gravity of the region of interest for the next imaging to the left-side adjacent region at the present imaging, $\beta$ represents the relative distance from the center of gravity of the region of interest for the next imaging to the upper-side adjacent region at the present imaging, and a and b represent weighting coefficients.

9. The image capturing apparatus according to claim 8, wherein the determination unit sets the weighting coefficient a to a larger value as a difference between the luminance L of the left-side adjacent region and the luminance R of the right-side adjacent region at the present imaging increases.

10. The image capturing apparatus according to claim 8, wherein the determination unit sets the weighting coefficient b to a larger value as a difference between the luminance U of the upper-side adjacent region and the luminance D of the lower-side adjacent region at the present imaging increases.

11. The image capturing apparatus according to claim 9, wherein the determination unit sets the weighting coefficient b to a larger value as a difference between the luminance U of the upper-side adjacent region and the luminance D of the lower-side adjacent region at the present imaging increases.

12. The image capturing apparatus according to claim 8, wherein the determination unit sets the weighting coefficients a and b to zero and sets the luminance C of the region of interest at the present imaging to the luminance K of the region of interest for the next imaging in a case where both a difference between the luminance U of the upper-side adjacent region and the luminance D of the lower-side adjacent region at the present imaging and a difference between the luminance L of the left-side adjacent region and the luminance R of the right-side adjacent region at the present imaging are smaller than a specific threshold value.

13. The image capturing apparatus according to claim 9, wherein the determination unit sets the weighting coefficients a and b to zero and sets the luminance C of the region of interest at the present imaging to the luminance K of the region of interest for the next imaging in a case where both a difference between the luminance U of the upper-side adjacent region and the luminance D of the lower-side adjacent region at the present imaging and the difference between the luminance L of the left-side adjacent region and the luminance R of the right-side adjacent region at the present imaging are smaller than a specific threshold value.

14. The image capturing apparatus according to claim 10, wherein the determination unit sets the weighting coefficients a and b to zero and sets the luminance C of the region of interest at the present imaging to the luminance K of the region of interest for the next imaging in a case where both the difference between the luminance U of the upper-side adjacent region and the luminance D of the lower-side adjacent region at the present imaging and a difference between the luminance L of the left-side adjacent region and the luminance R of the right-side adjacent region at the present imaging are smaller than a specific threshold value.

15. The image capturing apparatus according to claim 2, wherein, in a case where the change unit performs zoom-out control between the present imaging and the next imaging, the determination unit calculates a luminance of a region of interest for the next imaging by averaging a luminance of the region of interest at the present imaging and luminances of a plurality of regions adjacent to the region of interest at the present imaging.

16. The image capturing apparatus according to claim 2, wherein, in a case where the change unit performs zoom-out control between the present imaging and the next imaging, the determination unit estimates a luminance of a region of interest located in a peripheral portion in an angle of view of imaging for the next imaging based on luminances of the region of interest and an adjacent region at the present imaging.

17. A method for controlling an image capturing apparatus comprising a solid-state imaging device unit having a plurality of imaging regions for each of which exposure conditions are individually controllable, the method comprising:
   calculating, for a plurality of positions on the solid-state imaging device, a movement amount between a first position on the solid-state imaging device unit, corresponding to a portion in an image captured at present imaging, and a second position on the solid-state imaging device unit, corresponding to a same portion in an image captured for a next imaging, and calculating a direction in which the first and second positions move based on control information directed to the image capturing apparatus; and
   determining the exposure conditions for each of the plurality of imaging regions to be used for the next imaging based on luminance distribution information about a captured image at the present imaging, and the calculated movement amount and direction.

18. The method according to claim 17, further comprising changing an angle of view,
   wherein the movement amount and the direction are calculated based on a change between an angle of view at the present imaging and an angle of view for the next imaging.

19. The method according to claim 18, wherein a luminance of a region of interest for the next imaging is calculated by performing interpolation using a luminance of the region of interest at the present imaging and luminances of a plurality of adjacent regions adjacent to the region of interest at the present imaging to determine the exposure conditions for the region of interest for the next imaging.

20. A non-transitory computer-readable storage medium storing a program that when executed on a computer causes the computer to perform the method according to claim 17.

* * * * *